Patented Apr. 27, 1937

2,078,239

UNITED STATES PATENT OFFICE 2,078,239

ETHER RESINS

Carleton Ellis, Montclair, N. J., assignor to Ellis-Foster Company, a corporation of New Jersey No Drawing. Application March 13, 1930,
Serial No. 435,641

12 Claims. (Cl. 260—8)

This invention relates to resins, balsams and other analogous products resulting from the reaction between ether bodies containing hydroxyl, and the like, and those preferably containing a carboxyl or acid anhydride group or groups.

This application is a continuation in part of my copending applications Serial Nos. 193,726, 219,-562, 223,478 now Patent 1,970,510 and 226,826, and to other applications to which reference has been made in the cited applications, insofar as these appertain to the subject of the present invention.

In the category of compounds containing a carboxyl group there are included organic acids of high and low molecular weight. These organic acids (including their anhydrides) embrace a wide range of bodies. They include aliphatic and aromatic mono-carboxy or monobasic acids and the poly-carboxy or polybasic acids. The latter, of course, comprehend the di-carboxy acids. These groups comprise saturated and unsaturated acids; oxy or hydroxy acids, aldehyde acids, ketone acids and other acids containing substituent radicals composed solely of various assemblages of two or more of the elements C, H and O. Other acids are those formed by substituents of a different elemental character such as nitro, sulpho, chloro, bromo acids, and the like. Included with the aromatic acids are the reactive terpene acids. The cyclic acids of the aliphatic series or those containing both the aromatic nucleus and a cyclic aliphatic group also fall within the range of the acids whose use is not precluded under the present invention. Naphthenic acid may be utilized. By oxidizing naphthenes there are obtained, together with naphthenic acids, a series of products classed as polynaphthenic acids, these being mostly syrupy liquids. It is supposed that these polynaphthenic acids are tribasic. In all probability they exist as highly polymerized products and their use in accordance with the procedure of the present invention is not precluded.

Many of the foregoing acids are crystalline substances and these to a large degree contain in the molecule not over 10 or 12 carbon atoms. A few are water-soluble liquids or viscous bodies, and these as a rule weaken the resistance of the resulting complex towards water. This usually is disadvantageous in applications as coating compositions, but sometimes water-instability or water-solubility of the complex may be employed to advantage.

The fatty acids derived from the various natural animal and vegetable fats and oils, in other words, those of the natural glycerides, confer distinctive properties on the complex, including a notable degree of water-stability. The glycerides themselves likewise may be used, but being less reactive and assimilable than the free fatty acids they call for special procedures to bring the reaction to a satisfactory stage of completion or assimilation. These fatty acids generally have 16 to 18 carbon atoms in the molecule. Exceptions are the fatty acids of cocoanut oil, laurel oil, and the like, containing lauric acid (having 12 carbon atoms) and several fats and oils containing arachidic, erucic, behenic and similar acids containing over 18 carbon atoms. The employment of fatty acids (or their glycerides) containing one (mono) or more (poly) hydroxyl groups is not precluded. Oxidized fatty acids (blown oils) also are included.

A readily and cheaply available form of higher fatty acids is that obtained from the "soap stock" produced in the refining of glycerides, especially vegetable glycerides. Such acids may be modified and clarified by vacuum distillation.

Still another class of organic acids readily available are those of the natural resins. These are composed or contain reactive acids which are capable of adequately coupling the resin to the complex to yield products of utility.

More specifically the organic acids which may be used include succinic, citric malic, malo-malic, mucic, maleic, fumaric, tartaric, pyro-tartaric, glutaric, lactic, acrylic, adipic, hydracrylic, glycolic, azelaic, diglycolic, glyoxylic, suberic, hydroxy-butyric, aceto-acetic, pyro-racemic, pyruvic, benzoic, chlorbenzoic, nitrobenzoic, benzoyl-benzoic, toluyl-benzoic, cinnamic, salicylic, diphenic, naphthoic, naphthalic, toluic, hydrocinnamic, amino-benzoic or anthranilic, camphoric, and the like. Liquid acids of the lower aliphatic acid series, such as propionic and chloracetic, generally are used only in a very restricted way, owing to the resulting physical properties, lack of water-stability, and so forth.

Some of the foregoing acids are not particularly heat-stable and since the preferred form of making the complex is by heat treatment, I prefer to employ those acids which react easily with the other raw materials, but do not break down readily into carbon dioxide or other bodies not contributing to the yield of complex. Benzoic, phthalic and even salicylic acids are good examples of heat-stable reactive acids of the non-carbonizing type giving complexes of light color and in good yield. Of these, phthalic acid being cheaply prepared as the anhydride by the catalytic oxidation of naphthalene is highly appropriate and is therefore used largely in the following illustrations.

In using the term organic acid it should be understood that I include the anhydrides as indicated as also substances generating or rendering available any acid of a suitably reactive character.

Organic acids, which, besides conferring water-stable qualities on the complex, to a greater or lesser extent, have good heat stability within the range of heat treatment preferably contemplated are the higher fatty acids, that is, those acids containing over ten carbon atoms, or, generally speaking, the fatty acids of the animal and vegetable oils. These embrace the fatty acids of lard, tallow, neatsfoot, seal, whale, menhaden, cod, cocoanut, palm kernel, peanut, olive, cottonseed, corn, soya, palm, rape, sesame, linseed, tung, perilla and sunflower oils and their oxidized, blown or hydrogenated, chlorinated or otherwise substituted derivatives. These oils include such acids as lauric, myristic, palmitic, stearic, oleic, erulcic, behenic, linoleic, linolenic and clupanodonic acids.

Other and possibly more anomalous raw materials are the free acids of cocoa butter, Japan wax and castor oil.

The fatty acids of cottonseed oil "soap stock" distilled under reduced atmospheric pressure, are commercially available at relatively low cost and serve as a cheap supply of mixed fatty acids light in color. For a number of uses to which the complex is put, color is an important consideration. The lighter the color, the greater the degree of adaptability of the complex and the wider its market. In the one form of the invention I am able to produce a complex which is almost water-white and transparent, when viewed in thin layers. Dark brown or black products, e. g., resembling asphalt in color, are, of course, easier to prepare, but their field of utility in coating compositions is comparatively limited, and they are more appropriately employed in molded plastics and the like.

As indicated, the animal or vegetable oils themselves, in lieu of their fatty acids, may be employed by using special procedures such as are illustrated herein. Mixtures of the different oils may be used with or without inclusion of their free fatty acids. Likewise mixtures of the free fatty acids of different oils, especially those having differing chemical characteristics such as cottonseed acids and cocoanut acids, are desirable for certain purposes.

The various natural resins of commercial significance have acid properties and are reactive to form a complex suitable for various coating compositions. Hard products may be made with the aid of some of the copals such as the rather readily obtained congo. Pontianak copal, kauri, and the like, also may be utilized. For coating compositions solubility is important and these resins are desirably cracked by heat treatment. Heat may be applied sufficient to destructively distil over, for example, about 20 percent of the weight of the resin when the solubility will be found satisfactory for most purposes and the resin despite the heat treatment will, nevertheless, be found reactive with the other raw materials entering into the complex.

Other resins are dammar, sandarac, mastic, elemi and particularly rosin and oxidized rosin.

Rosin may be employed as the sole natural resin, or it may be admixed with other resins. Products containing any large proportion of rosin are not as desirable for exposure as those made with some of the other raw materials mentioned.

Oxidized rosin may be made by pulverizing ordinary rosin and exposing to warm air at a temperature below the melting point and as oxidation progresses the melting point rises, hence the temperature may gradually be increased. The rosin may contain an oxidizing catalyst such as a lead or manganese compound. Oxidation also may be caused to take place by blowing air through molten rosin in the presence of a catalyst or by treatment with hypochlorite or other chemical oxidizing agents. Oxidized rosin does not have the tackiness characteristic of ordinary rosin and possesses a considerably higher melting point if well oxidized. Some of the other oxygen-absorbing resins likewise may be oxidized.

In some cases it is desirable to incorporate a comparatively inert resin such as cumaron resin in the complex, not necessarily in chemical combination, but as a fluxing agent, or otherwise, to modify the character of the complex by simple blending, or by such mild action as may occur on heating.

While light color, solubility in appropriate organic solvents and resistance to atmospheric action are considerations of importance when the complex is to be used in coating compositions, these qualities, especially solubility, are of less significance when the complex is to be used in making plastic molding compositions, insulation, and the like. Uncracked copal may be used in the latter composition in some cases.

Ether bodies of diverse character reactive to form ether resins and ether balsams within the confines of the present invention are available. For example, the condensation of two or more molecules of a given glycol provides simple or inter-ethers; e. g., two molecules of ethylene glycol condense to dihydroxydiethylether, three molecules give the dihydroxytriethyldiether, and so on. Another type is represented by polyhydric alcohols containing a substituent at the hydroxyl, e. g., mono or dimethyl or propyl ether of glycerol. The mono ethyl ether of ethylene glycol has one hydroxyl free for reactive purposes. Thus the ether resins of the present invention embrace simple ether resins and mixed ether resins (likewise ether balsams).

The following examples of ether resins taken from the cited applications will serve for illustrative purposes.

Equi-molecular proportions of glycol ether and tetrachlorphthalic acid with 1 per cent of urea were heated to 260° C., yielding a viscous reddish brown ether balsam insoluble in toluol, but soluble in various mixed solvents such as a mixture of equal parts of toluol, butyl acetate and butyl alcohol. The solution had a yellow fluorescence.

In the foregoing example the glycol ether employed was that formed by the condensation of two molecules of glycol yielding the dihydroxy diethyl ether. The following example is prepared from the dihydroxy triethyl diether. This ether and succinic acid in equi-molecular proportions were heated with 1 per cent of urea to 290° C. and held at this temperature for ½ hour, yielding a soft sticky balsam of light amber color, with acid number of 21.6 and soluble in mixed nitrocellulose solvents.

Products of a more complex nature may be derived as follows:

| | Parts by weight |
|---|---|
| Glycol-ether (dihydroxy diethyl mono ether) | 106 |
| Cocoanut oil | 40 |
| Phthalic anhydride | 148 |

On heating these substances together to induce reaction, agitation was employed and the reaction receptacle was equipped with an air-cooled reflux condenser. A viscous balsam of pale amber color and with acid number 24.2 resulted on heating to about 300° C. Although not soluble in toluol, a solution was obtained with a mixture of equal volumes of toluol and butyl acetate, or in a mixture of like proportions of benzol and denatured alcohol. This balsam is compatible with nitrocellulose and the solutions of nitrocellulose with the balsam yield clear transparent films.

| | Parts by weight |
|---|---|
| Glycol di-ether (trihydroxy triethyl di-ether) | 150 |
| Cocoanut oil | 20 |
| Peanut oil | 20 |
| Phthalic anhydride | 148 |

On heating to about 300° C. until the acid number was approximately 22 a viscous balsam of pale straw color was derived. It was soluble in a mixture of butyl acetate and toluol, but not in toluol alone. The balsam showed good compatibility with nitrocellulose when both were dissolved in this solvent mixture.

The proportions of nitrocellulose in useful coating compositions may be varied considerably with respect to the resin or balsam of the present invention. For very hard surface finish the nitrocellulose may predominate but for softer and more flexible coatings the resin or balsam (as the case may be) can be used in relatively high proportion, say from 2 to 10 parts by weight to one part of nitrocellulose.

The nitrocellulose used may be of low or high viscosity, but preferably I employ a grade slightly over 1 second and not exceeding 5 seconds viscosity in making lacquers, whereas high viscosity nitrocellulose such as celluloid, cotton or smokeless powder may be employed with the resin or balsam in making molded products, plastic masses for sheeting to form the tread of felt base floor covering, and for various other purposes.

By employing a non-drying oil or its fatty acid and especially by reacting a substantially or relatively saturated glyceride oil such as cocoanut oil (or its free acids) I reduce the tendency to oxidation changes in a coating on long exposure, and the stabilization thus effected I consider to be of material benefit.

Cocoanut oil or other animal and vegetable oils embraced herein may be chilled and pressed to secure low cold test grades and either the press cake or the more liquid glycerides employed in the reaction. The free fatty acids themselves likewise may be chilled and pressed to secure different grades of varying fluidity.

For many purposes, especially in making coating compositions, a low acid number is desirable. There is less tendency to livering with basic pigments and in the case of nitrocellulose lacquers a low acid number is considered safer. Also, if the composition is to be used for insulating purposes low acidity is desirable. A complex which has been extensively reacted so that the acid number is 30 or less thus is preferred. To obtain this relatively low index of acidity and yet to preserve solubility in various mixed organic solvents is one of the requisites of the preferred form of the present invention.

Such a result may be achieved by employing a resinifying flux of the hydroxy- or oxy-ether type. Such reactive non-acid fluxes are found in the glycol-ethers, dihydroxy diethyl mono ether ($CH_2OH.CH_2.O.CH_2.CH_2OH$) being an illustration of a substance very effective for the purpose.

By proceeding in accordance with the disclosures of the present invention I am thus able to control acid number with respect to solubility and thereby easily and cheaply to obtain resins, balsams and other complexes of value in the coating, plastic and insulating industries.

The distilled fatty acids of animal and vegetable oils also may be used in making the non-siccative complex. Drying or semi-drying oils may be blown to such an extent that they lose siccative properties almost completely. Reactive blown oils or their fatty acids, having substantially non-siccative qualities are included with the raw materials employed in the present invention. These include the blown derivatives of corn, cotton, soya, castor, rape and other vegetable (or animal) oils. Blowing to a condition of substantial non-siccativity introduces oxygen at double bonds and thus creates loci of condensation.

In the illustrative examples all the constituents are reacted together simultaneously. This, however, need not be the case in all circumstances as the reaction may be started with, say, two of the ingredients and the third (and fourth, etc., if used) added later, usually avoiding attainment of conditions of instability leading to formation of infusible polymers. For example, if phthalic anhydride and glycerol (a mix which readily forms insoluble condensation bodies) are being heated together, the neutral reactive flux, e. g., glycol-ether, preferably should be added in advance of material headway in the formation of insoluble products of condensation.

Resins and balsams likewise may be prepared by reaction between a glycerol ether, a crystalline organic acid and the fatty acids of various drying oils, such as linseed, tung, and the like.

Among the advantages accruing from the employment of hydroxy ethers as agents of resinification in the production of synthetic resins and balsams are that a dihydroxy ethyl ether such, for example, as results by inter-etherification of ethylene glycol, is a good solvent and possesses the advantage that when the completed resin or balsam is to be used with a cellulose ester, such as nitrocellulose, in making lacquers and other coating compositions, and the like, this ether is available as a solvent for nitrocellulose and therefore should an excess of the ether be employed in making the resinified material the presence of such excess does not have any unfavorable effect upon the solubility of the nitro-cellulose.

Attention has been called in a number of my copending applications to certain difficulties which arise in attempting to bring into combination in a glycerol phthalate resin a glyceride oil. The addition of an oil to glycerol and phthalic anhydride with the object of reacting that oil into combination in the ultimate resin is not always successful, since the rate of reaction of phthalic anhydride and glycerol is so rapid that polymerization of the glycerol phthalate into an insoluble, infusible mass may occur well before any substantial part of the oil has had opportunity to combine. The dihydroxy ethyl ether aforesaid, however, permits of the progress of reaction with far more complete interresinification of the several components, permitting the formation of thoroughly resinified complexes of relatively low acid number.

A balsam may be prepared in which linseed oil is an essential component, the proportions being as follows:

| | Parts by weight |
|---|---|
| Light colored linseed oil | 90 |
| Diethylene glycol | 106 |
| Phthalic anhydride | 148 |

The mixture was heated with agitation and an air-cooled reflux condenser was attached to the heating receptacle, the length of this condenser being such that water vapor could readily escape, while the glycol ether was retained. The temperature was carried to 200° C. in a period of about 10 or 15 minutes. The reaction mixture at first was cloudy resembling an emulsion, but on raising the temperature to 250° C. the turbidity disappeared and the linseed oil went into combination with the glycol ether phthalate. The temperature was carried to 290° C. and it was observed that polymerization to an insoluble infusible material did not occur. Instead, a resinous balsam, which was transparent, was obtained. The balsam was soluble in toluol and its acid number was found to be 23.4. This low acid number indicates an advanced stage of reaction. Nevertheless, the product was completely soluble in a number of organic solvents.

The reaction may be carried out as indicated above, with the several components heated together, or may be conducted in stages, first forming the glycol ether derivative and then adding the glyceride oil and carrying the reaction on until the oil has combined sufficiently.

In another case the following mixture was prepared; proportions given being by weight:

| | Parts |
|---|---|
| Refined cottonseed oil | 80 |
| Phthalic anhydride | 148 |
| Glycerol | 32 |
| Diethylene glycol | 53 |

The mixture was heated in the same manner as set forth above, but no infusible polymer formed. The cottonseed oil required a somewhat higher temperature to enter into combination with the other components and a clear melt was not obtained until the temperature reached about 310° C. The temperature was carried finally to 320° C. without infusible bodies forming. The product was found to be soluble in various solvents and mixtures of solvents. It was soluble in a hydrocarbon such as toluol. The product is a tough, gummy substance of light brown color. It is compatible with nitrocellulose. The acid number of this synthetic product was 27.5.

Thus in preparing the resins and balsams of the present invention there may be used the simple ethers of the polyhydric alcohols, that is, those obtained by self-condensation of a single polyhydric alcohol or mixed ethers produced by condensation of mixtures of polyhydric alcohols, likewise by condensation of monohydric alcohols with polyhydric alcohols; the monohydric alcohol being, if desired, an aliphatic alcohol or an aromatic alcohol or other suitable hydroxy compound. The manner in which the ether whether simple or mixed is made is not in any wise a part of the present invention, such reference as has been made to methods of making being for the purpose of elucidation of the composition of these bodies. In some cases it will be found advantageous to use, for example, the mono phenyl ether of glycerol or other similar reactive resinifying mixed ethers. In the foregoing illustrative examples, therefore, I contemplate replacement of the ether specified by any other simple or mixed ether having the reactive resinifying or balsamizing properties requisite in yielding the products of the present invention and, furthermore, I contemplate such replacement be made in whole or in part; thereby to secure a great variety of resins, balsams, plasticizers and softening agents adapted for numerous uses in the plastic and coating industry as components of molding compositions, paints, varnishes, lacquers, cements, waterproofing materials, various impregnating compositions, and so forth.

In the foregoing I have noted the desirability in some cases of incorporating resinous bodies derived from other sources and I wish to point out specifically the incorporation with the resins or balsams of the present invention other synthetic resins, especially those of the phenolic aldehyde type. The interreaction of phenol formaldehyde resin or preferably xylenol formaldehyde resin with the glycol ether resins aforesaid is within the purview of the present invention. In a similar manner the glycerol ether resins and glycerol ether balsams included herein may be incorporated or inter-resinified with phenolic resins as aforesaid.

The field of invention, therefore, comprised hereunder is that of the ether resins, particularly the hydroxylated ether resins, that is hydroxylated ethers resinified through reaction taking place at the hydroxyl groups. Included also are various balsamic products similarly derived. While it is a specific object herein to provide resins which are soluble in various organic solvents and which may be used in various coating compositions, with or without hardening or toughening agents such as nitrocellulose, I may in some cases produce resins of an insoluble character which have uses in the plastic industry or elsewhere. However, the preferred embodiment is an ether resin (or ether balsam) soluble in organic solvents and adapted to be incorporated with nitrocellulose so as to form lacquer coating compositions of a compatible character. It is my belief that the presence of the ether group in the raw materials used in making the ether resins and ether balsams of the present invention tends to increase the compatibility or blendability of the resin with nitrocellulose with consequent improvement of the resulting lacquer film, all to a degree of a significant character from the industrial standpoint.

Sometimes it is desirable to prepare the ether resins or balsams in a form soluble in an aqueous alkaline medium, such as water containing a small amount of ammonium hydroxide, or to produce emulsions from appropriate ether resins and balsams.

Finally, it should be noted that ethers of a mixed character of the type represented by the resinification of methyl or propyl ether of glycerol will yield on complete saponification or hydrolysis a polybasic acid, a polyhydric alcohol and a monohydric alcohol. If the mixed ether employed in making the resin or balsam contains in combination a monohydric aliphatic alcohol, the latter will be released by such complete hydrolysis. The invention therefore embraces synthetic resins (including balsams) which upon complete hydrolysis yield a polybasic acid, a polyhydric alcohol, a monohydric alcohol of the aliphatic or aromatic series, and in some cases a monobasic acid.

What I claim is:

1. A polybasic organic acid-monobasic organic acid-polyhydric alcohol ether resin.

2. A phthalic-fatty acid-polyhydric alcohol ether resin.

3. A phthalic-higher fatty acid-polyhydric alcohol ether resin, said fatty acid having more than ten carbon atoms.

4. A polybasic organic acid-polyhydric ether synthetic resin which upon complete hydrolysis yields a polybasic acid, a polyhydric alcohol and a monohydric alcohol.

5. A polybasic organic acid-polyhydric ether synthetic resin which upon complete hydrolysis yields a polybasic acid, a monobasic acid, a polyhydric alcohol and a monohydric alcohol.

6. A polybasic organic acid-polyhydric ether synthetic resin which upon complete hydrolysis yields a polybasic acid, a polyhydric alcohol and a monohydric aliphatic alcohol.

7. A polybasic organic acid-polyhydric ether synthetic resin which upon complete hydrolysis yields phthalic acid, a polyhydric alcohol, and a monohydric alcohol.

8. A phthalic-fatty acid-polyhydric mixed ether resin.

9. A resin prepared by reacting a mixture of glycerol and dihydroxy alcohol ether with a dibasic acid in the presence of fatty oil.

10. A resinous reaction product of a dihydroxy ether with phthalic anhydride and cocoanut oil.

11. A resin containing the reaction product of hydroxy butyric acid and a polyhydroxy alcohol.

12. A resin containing the reaction product of hydroxy butyric acid, polyhydroxy alcohol and an oil fatty acid.

CARLETON ELLIS.